United States Patent
Bantz et al.

(10) Patent No.: US 8,137,107 B2
(45) Date of Patent: Mar. 20, 2012

(54) KNOWLEDGE MANAGEMENT FOR RECURSIVELY VIRTUALIZED TEAMS

(75) Inventors: David F. Bantz, Portland, ME (US);
Jarir K. Chaar, Tarrytown, NY (US);
Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1327 days.

(21) Appl. No.: 10/732,327

(22) Filed: Dec. 10, 2003

(65) Prior Publication Data

US 2005/0131827 A1    Jun. 16, 2005

(51) Int. Cl.
*G09B 19/00* (2006.01)
(52) U.S. Cl. .................. 434/219; 434/362; 705/7.38
(58) Field of Classification Search ............... 434/219; 705/9–11
See application file for complete search history.

(56) References Cited

U.S. PATENT DOCUMENTS

| | | | | |
|---|---|---|---|---|
| 6,157,808 | A | 12/2000 | Hollingsworth | 434/350 |
| 6,502,113 | B1* | 12/2002 | Crawford et al. | 715/210 |
| 6,820,081 | B1* | 11/2004 | Kawai et al. | 707/7 |
| 2001/0051913 | A1* | 12/2001 | Vashistha et al. | 705/37 |
| 2002/0120461 | A1* | 8/2002 | Kirkconnell-Ewing et al. | 705/1 |
| 2002/0156674 | A1* | 10/2002 | Okamoto et al. | 705/11 |
| 2002/0198766 | A1* | 12/2002 | Magrino et al. | 705/11 |
| 2003/0083891 | A1* | 5/2003 | Lang et al. | 705/1 |
| 2003/0200168 | A1* | 10/2003 | Cullen et al. | 705/37 |
| 2004/0241627 | A1 | 12/2004 | Delfing | 434/219 |

OTHER PUBLICATIONS

Florida Departement of Education. "DOE Information Data Base Requirement." Jul. 1, 1991.*
Florida Statutes 2001 Chapter 232.*
"The Real Value of Knowledge", Greg Nielson, http://certcities.com/editorial/columns/story.asp?EditorialsID=138.
"Computing Degrees Scheme" http://cis.paisley.ac.uk/courses/ug-ccds.html.

* cited by examiner

*Primary Examiner* — Xuan Thai
*Assistant Examiner* — Robert J Utama
(74) *Attorney, Agent, or Firm* — Ido Tuchman; Louis J. Percello

(57) ABSTRACT

A method, system, and computer program for interacting with team members of a virtual team. Persistent storage is configured to store collective qualifications of the virtual team based on the individual qualifications of the team members, while a team broker is configured to present the collective qualifications to third parties. Thus, the broker provides a dynamic representation of the collective knowledge, skills and experience of a virtual team. The broker further enables an entity, such as a team employer or teacher, to interact with the virtual team as if that team were a single entity, rather than a collection of individual members.

19 Claims, 7 Drawing Sheets

KNOWLEDGE MANAGEMENT FOR RECURSIVELY VIRTUALIZED TEAMS

CROSS-REFERENCE TO RELATED APPLICATIONS

This application is related to co-pending U.S. patent application Ser. No. 10/732,327, filed Dec. 10, 2003 for "AUTOMATIC DETERMINATION OF E-LEARNING OBSOLESCENCE", which is commonly owned and is hereby incorporated by reference in its entirety.

FIELD OF THE INVENTION

The present invention generally relates to virtual teams, and, more specifically, to arrangements for interacting with virtual teams.

BACKGROUND

In today's fast-paced environment, it is often necessary to form a team quickly to address some subject. Many traditional institutions are not well suited for collaboration among team members. For example, academic institutions and accrediting agencies typically focus on individual performance rather than team accomplishments. A conventional education degree is awarded to an individual rather than a group of people. In some situations, however, it may irrelevant to an employer whether an individual or a group of individuals possess a required set of skills and knowledge. For example, a consulting team may claim expertise in network security. An employer hiring this team may be unconcerned about how network security knowledge is divided among the team members. The employer may just care that the consulting team possesses the network security knowledge.

A team is often constituted of individuals with specific skills, some of which may be unique to the team. No single member of the team may be familiar with the entire subject, yet all team members may need to contribute with knowledge of various aspects of the subject. It is currently difficult to replace team members with others, in the event that a team member becomes unavailable for personal reasons, or because some higher-priority subject requires his or her skills. Furthermore, it may also be the case that a team must study a subject or some domain of expertise in order to satisfactorily perform its objective. No single student may necessarily have the time to learn all of the necessary material. Conventional team environments are generally unsuited to deal with such responsibility apportionment to selected team members in a manner that reflects the collective knowledge, skills and experience of a team.

SUMMARY OF THE INVENTION

The present invention addresses the above-mentioned limitations of conventional team environments by providing a dynamic representation of the collective knowledge, skills and experience of a virtual team. The invention enables dynamic teams to present an accurate assessment of their reputation (e.g., results achieved), demonstrated skills, accredited mastery of subject matter and trust (e.g., results achieved compared to the requirements of a contract) in order to bid for and win service engagements automatically. The invention helps create a global workplace and facilitates inquiries about the reputation and trust of service providers. The invention enables an entity, such as a team employer or teacher, to interact with the virtual team as if that team were a single entity, rather than a collection of individual members.

Thus, one aspect of the invention is a method for interacting with team members of a virtual team. The method includes a presenting operation configured to expose collective qualifications of the virtual team based on individual qualifications of the team members. A receiving operation is configured to accept an inquiry about the virtual team from a third party. A retrieving operation obtains team information about the virtual team from a centralized database, and a sending operation sends an inquiry response to the third party. The inquiry response includes at least some of the team information from the centralized database.

Another aspect of the invention is system for interacting with team members of a virtual team. The system includes persistent storage and a team broker. The persistent storage is configured to store collective qualifications of the virtual team based on the individual qualifications of the team members. The team broker is configured to present the collective qualifications to third parties. In particular embodiments of the invention, the collective qualifications may include education information and experience information. Furthermore, the third parties may include education service providers and team employers.

Yet another aspect of the invention is a computer program product for interacting with team members of a virtual team. The computer program includes program code to present collective qualifications of the virtual team based on individual qualifications of the team members, receive an inquiry about the virtual team from a third party, retrieve team information about the virtual team from a centralized database, and send an inquiry response to the third party including at least some of the team information from the centralized database.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
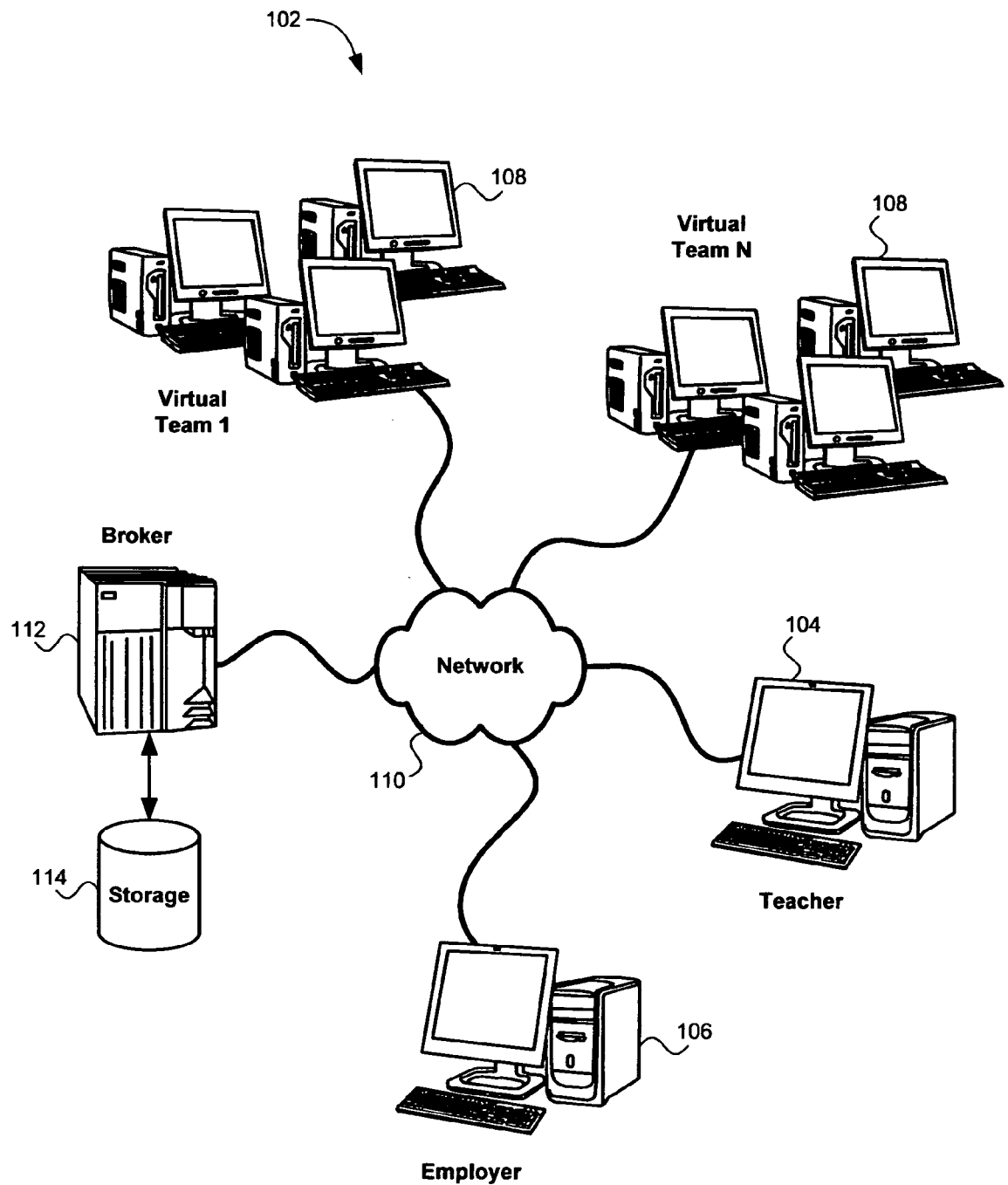
FIG. 1 shows an exemplary environment embodying the present invention.

FIG. 1 shows an exemplary environment 102 embodying the present invention. It is initially noted that the environment 102 is presented for illustration purposes only, and is representative of countless configurations in which the invention may be implemented. Thus, the present invention should not be construed as limited to the environment configurations shown and discussed herein.

In one configuration of the invention, the environment 102 includes a teacher 104, a broker 112, and virtual teams 108 coupled to a network 110. The network 110 may be any network known in the art for effecting communications between the entities in the environment 102. Thus, the network 110 can be a local area network (LAN), a wide area network (WAN), or a combination thereof. It is contemplated that the network 110 may be configured as a public network, such as the Internet, and/or a private network, and may include various topologies and protocols known in the art.

The teacher 104 may be an education service provider, such as a college professor, an accrediting agency, or an online course, and is selected by a virtual team 108 through its team members. In a typical scenario, the teacher 104 lectures to several students, some of who may be physically present, while others appear as text, icons, or images on the professor's computer screen. Even a student who is physically present may be only a representative of the virtual team 108. A virtual team 108 is considered present if any team member is present. Mandatory homework is considered completed if any team member completes it. In-class or online exams, especially review exams (midterm, final), can be attended by the entire team 108, and team members are permitted to communicate among themselves during the exam, but not with other students. If the virtual team 108 attends lectures in person the teacher 104 can see that a team, rather than a single individual student, is taking his or her course. However, if the virtual team 108 is not physically present but is represented by an avatar on a computer screen, the teacher 104 may never know whether his or her course is being taken by a single student or by a virtual team 108.

The teacher 104 interacts with virtual teams 108 using the network 110. The teacher 104 can record and update information regarding the virtual team's completion of educational objectives. Thus, the teacher 104 can maintain accurate and up-to-date status about virtual team 108. This information can be subsequently transmitted to the broker 112 using the network 114 to keep the broker's records about the team 108 in complete, accurate and up-to-date status. As described in more detail below, the team 108 can use educational services more effectively through its division of responsibility for learning subject matters. Furthermore, implementation of the contemplated environment 102 generally does not require that instructors and educational establishments change their models; their models can remain that of a single entity.

In another configuration of the invention, the environment 102 includes a team employer 106 coupled to the network 110, where the virtual team 108 provides services to the team employer 106. For example, the team 108 may conduct an audit of the security practices and policies for the employer 106. One team member may specialize in the security of the employer's information technology delivery department, another team member may specialize in the measures needed to assure the security of the employer's personnel, and yet another team member in the security of physical assets. The team 108 is selected by the employer 106 on the basis of a resume of qualifications representing the qualifications guaranteed to be present in the team 108, not the actual qualifications of the team members. It is contemplated that the team employer 106 may be any entity requiring the services of the virtual team 108, such as a contractor, a business, an institution, or a government agency.

The virtual team configuration of the present invention is advantageous to the team members in that contracts binding the team 108 do not restrict the activities of the individual members. Moreover, the virtual team 108 is advantageous to the team employer 106 in that the team 108 may be reconstituted to acquire critical skills for specific services to target the employer's needs more precisely. The team 108 can be seen as more predictable, because it does not fail to meet deadlines if one of its members has a personal emergency and cannot perform. The team 108 may be able to provide its services more economically because its members are free to engage in other virtual teams as soon as their responsibilities to the team 108 are discharged.

The broker 112 is configured to facilitate interactions with the virtual team 108. For example, the employer 106 may use the services of a broker 112 to select among candidate teams 108 for employment. In a particular embodiment of the invention, the broker 112 may visually identify virtual teams 108 on a computer screen, summarizing such team attributes as collective qualifications, duration of team activity, rate of team member flux, aggregated education level, demographics of team members, prior successes of the team, number of team members, and/or other team characteristics. The teams 108 can update the broker's records to ensure that the broker 112 has complete and up-to-date information about them. The broker 112 may further include persistent storage 114 to store data pertaining to candidate teams 108 for selection by the employer 106, as well as information about team members and perspective team members. In one embodiment of the invention, the broker 112 and teams 108 are implemented as Web services. Details about Web services can be found in the book *Web Services* by Ethan Cerami, O'Reilly and Associates, published February 2002, ISBN 0596002246, which is incorporated herein by reference in its entirety.

In a particular implementation of the invention, the team employer 106 first accesses the broker 116 with a team selection criteria, possibly including, but not limited to, cost, schedule, experience, educational credits, service guarantees, geographic locality, professional accreditation, language fluency, and the like. The broker 112 returns a list of teams that satisfy the supplied criteria to the employer. The employer 106 may also furnish a function or procedure by which a "best" score can be computed given the degree to which each team satisfies the given criteria. For example, the employer 106 may specify that lower hourly rate teams 108 are preferred. If such a function or procedure is supplied to the broker 112, then broker 112 can return an ordered list to the employer 106 (i.e., teams listed in order of incrementing hourly rate). Otherwise, the employer 106 may use such evaluation criteria as normally used to select among the candidate teams. Thus, the broker 112 supplies accurate and current information to the employer 106 concerning the virtual teams 108. In a similar manner, the broker 112 can record and update information kept for a virtual team 108 regarding its completion of educational objectives. A teacher 104 can maintain accurate and up-to-date status about the virtual team 108. This information can then be transmitted to the broker 112 to keep the broker's records in complete, accurate and up-to-date status.

It should be appreciated that the knowledge represented by a given virtual team 108 is highly dynamic, both because the team 108 learns on the job and through educational services, and also because team members may be shared with other teams and are learning through those teams. The present invention beneficially offers a system to represent team knowledge and experience accurately and currently to employers 106 and teachers 104. The invention includes a representation for the virtual team's knowledge/experience as a whole and a representation of each team member's knowledge/experience. Both representations are updated when some measurable change in knowledge is achieved. For example, the knowledge representation is updated when a given course module is completed or a work milestone is achieved. In this way, an accurate and current representation of the collective knowledge and experience of the virtual team 108 is always available, both to current employers 106 and teachers 104 and to prospective employers and teachers.

The broker 112 may be configured to bill entities based on access to team information. For example, the broker 112 may be configured as a service provider for interacting with team members on a per-use basis, a flat fee basis, or a percentage of an employment contract. The broker 112 may bill the team members, teacher 104 and/or employer 106 for its services. The broker 112 may also be configured to bill unrelated third parties for information access. For instance, the broker 112 may charge advertisers fees for information that can help target their advertisements to particular audiences.

At this point, the concept of a virtual team 108 is discussed in more detail. A virtual team is defined as a group of team members with a common objective or goal. For example, the team members may be a group of students with the objective of completing an educational course offered by the teacher 104. In another example, the team members may be arranged to supply consulting services to the team employer 106. Team members may further include, but are not limited to, listening devices, recording devices, computer software agents, companies, communities, towns, states, and the like. Decisions about the constitution of the team 108 and the division of responsibility within the team 108 need not be the concern of either team's employer 106 or teacher 104. The team 108 may represent its capabilities in a single resume that lists the accomplishments of the team 108 as a whole.

The virtual team 108 may enter into a contract to provide services. Furthermore, the team 108 is free to release one or more of its members from the need to work to satisfy a contract if the skills of that member are not required for that contract. The team 108 may represent itself as having acquired education credits for certain subjects or a university degree, even though no single member of the team possesses such credits or a degree. Thus, the team 108 is virtualized in that for all intents and purposes it is represented as a single entity, and the exact composition of that entity can vary over time.

The members of a team 108 may also be virtual teams rather than simply individuals. In other words, some or all of the members of the team can be other virtual teams. This hierarchical virtual team structure permits substitution within a role. For example, if a virtual team 108 requires a member knowledgeable in digital signal processing, that member may be a virtual team of whose members have complete knowledge of digital signal processing, or whose members collectively represent the necessary knowledge. The former case of redundancy of knowledge among team members permits substitution, while the latter case permits the assembly of a virtual team from individuals whose knowledge is specialized within the domain.

The employer 106 to whom the virtual team 108 provides services, or the teacher 104 of the virtual team 108, has a view of the virtual team 108 at any instant in time. To the extent that the team 108 is constituted of visible team members, a view consists of those members that are visible to its employer 106 or teacher 104. Different employers 106 or teachers 104 may have different views of the same team 108 at a given time, and a single employer 106 or teacher 104 may have different views of the same team 108 at different times.

Figure 2:
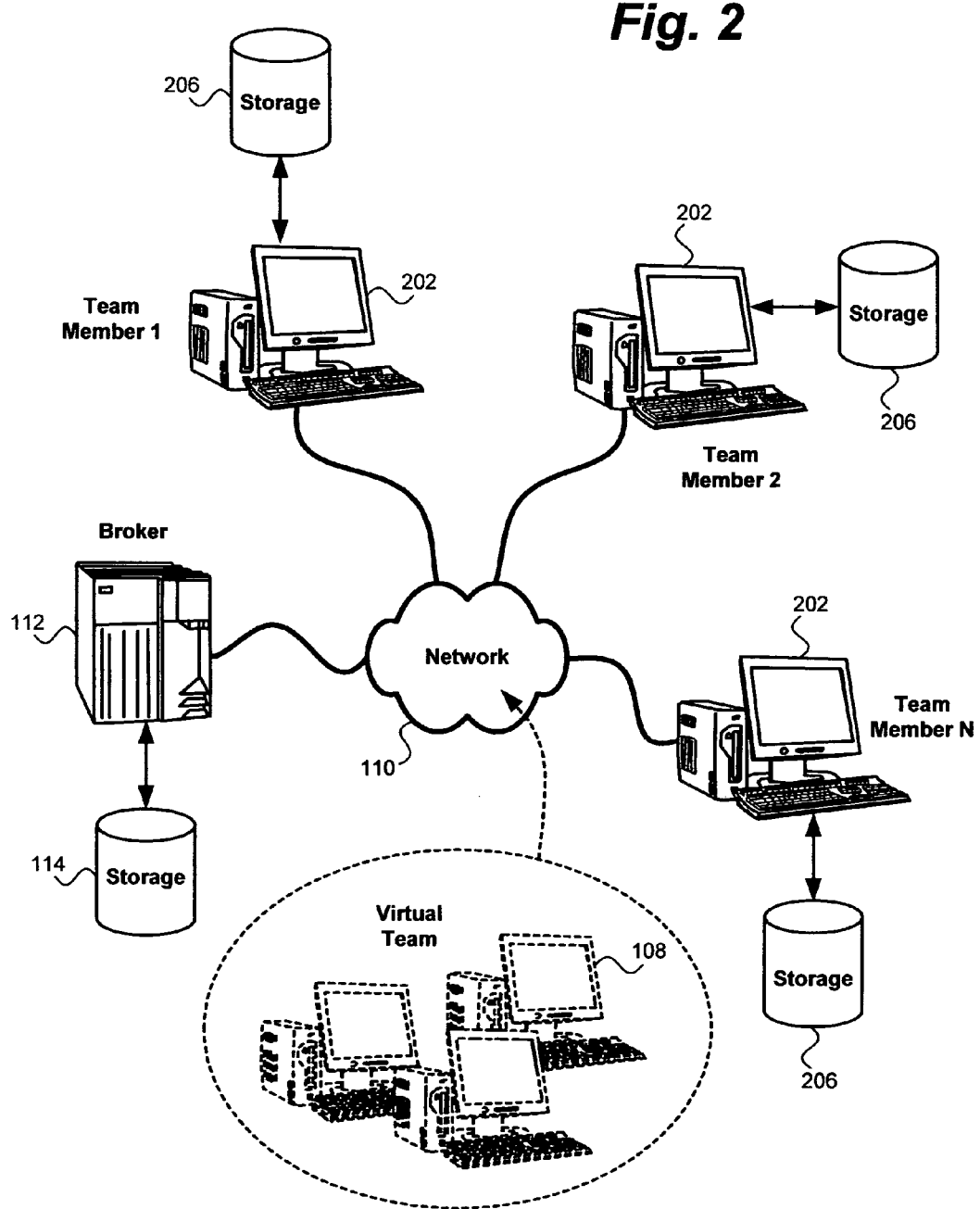
FIG. 2 shows the relationship between a virtual team, team members, and a team broker, as contemplated by one embodiment of the invention.

With reference to FIG. 2, an exemplary relationship between a virtual team 108, its team members 202, and the broker 112 is now discussed. As previously mentioned, the virtual team 108 exists through its team members 202 and the associations established by the broker 112. In other words, the team 208 is an abstraction or virtualization of the combination of the broker 112 and the team members 202. Although the team members 202 are shown as individual clients, it is contemplated that any team member 202 can be replaced by another virtual team 108.

Each team member 202 may include persistent team member storage 206. Team member storage 206 is configured to store information about the individual team member 206 and, perhaps, the team 108. Typically, information contained in the team member storage 206 is transferred to the broker 112 in response to requests for specific information about the team member 202. The broker 112 supports the appearance of a virtual team 108 as a single entity, both for the purposes of education and for service provision, and for any other purposes required. The broker 112 enables the virtual team's employers and/or teachers to interact with the virtual team as if the team 108 were a single entity, rather than a collection of individual members 202.

One of the values of the present invention to team employers and teachers is a simplification of the interaction with the team. The employer and teacher need not be aware of the identities of the team members 202, nor any change in the team's composition. The invention is also of value to the team members 202 in that it increases each individual's range of choice as to the role, timing and extent of their participation in the team 108. The invention also reduces or eliminates the need for a team member 202 to learn more than a portion of subject matter needed to deliver a service.

Figure 3:
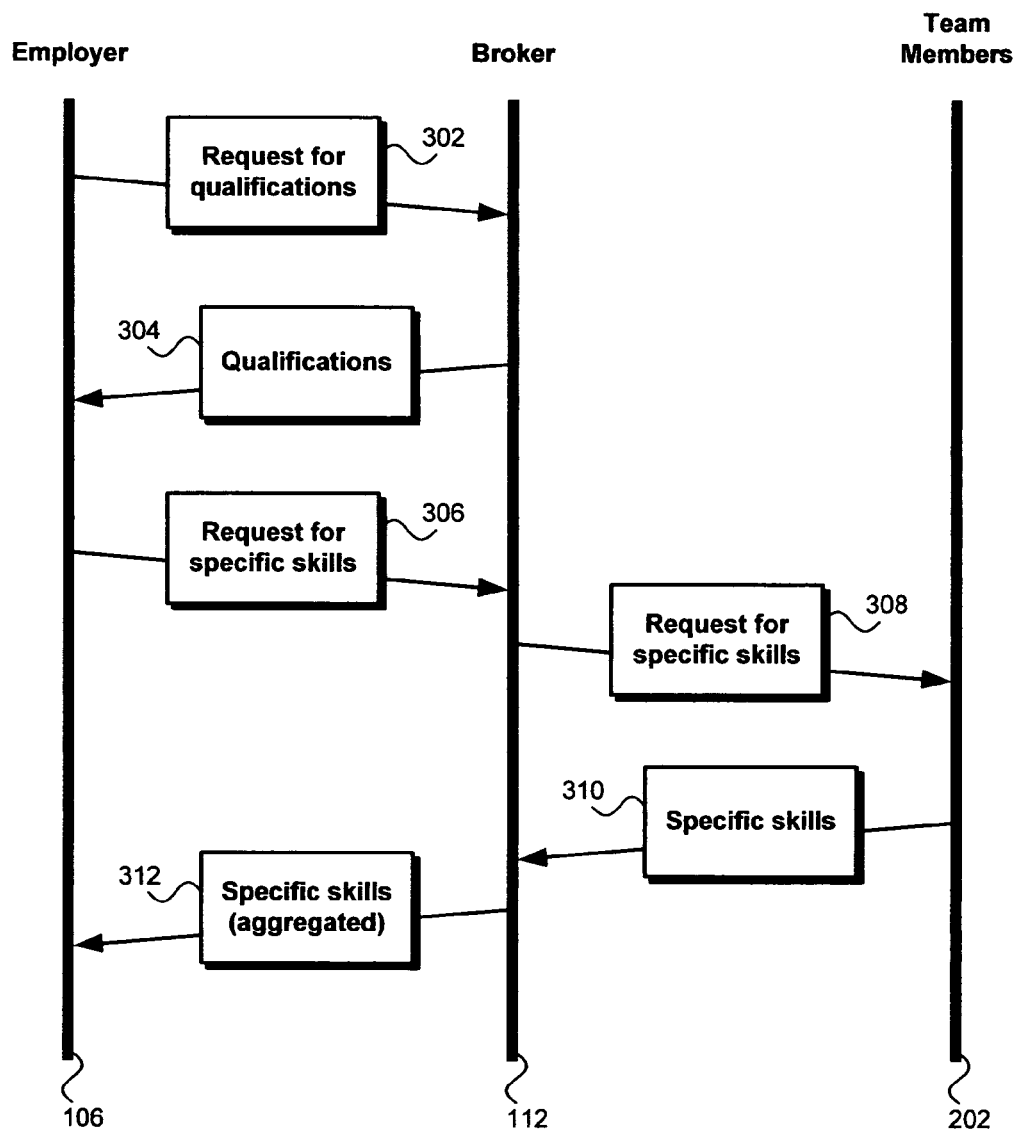
FIG. 3 shows an exemplary flow of messages between a team employer, a team broker and team members.

FIG. 3 depicts a typical flow of messages between a team employer 106, a team broker 112 and team members 202. The protocol begins with a request for qualifications message 302 from the employer 106 to the broker 112. This message 302 expresses a desire on behalf of the employer 106 to obtain the most recent and accurate qualifications of a particular virtual team as currently constituted. In a one embodiment of the invention, the message 302 is represented as a Simple Object Access Protocol (SOAP) message, a variant of extensible Markup Language (XML). SOAP is described in the book "Understanding SOAP," by Kennard Scribner and Mark C. Stiver, SAMS publishing, Indianapolis IN, 2000, which is incorporated herein by reference in its entirety. XML is described in the book "XML in a Nutshell" by Elliotte Rusty Harold and W. Scott Means, O'Reilly and Associates, 2002, which is incorporated herein by reference in its entirety.

After the request for qualifications message 302 is received by the broker 112, the broker 112 responds with a current qualifications message 304. The current qualifications message 304 includes a listing of qualification of the virtual team as would be found generally useful to the employer 106. The employer 106 then analyzes the qualifications and, for example, determines that its particular demands require specific skills not addressed in the qualifications message 304. To obtain more information, the employer 106 then originates a request for specific skills message 306 to broker 112.

The broker 112 may not maintain information sufficient to respond directly to the request for specific skills message 306. The broker 112 therefore sends a request for specific skills message 308 to the team member(s) 202. This message 308 may be a duplicate of the original request message 206 from the employer 106, or may be modified due to the broker's knowledge of the role that each member 202 plays in the team. It may therefore be the case that broker 112 must query more than one team member 202 in order to respond to the request for specific skills message 306 received from the employer 106. In such cases, the broker 112 may issue multiple requests for specific skills messages 308 to the various team members 202. Alternatively, if a reliable means is available, the message 308 may be sent to some or all of the current team members 202 using a broadcast protocol, such as that described by J. Chang and N.F. Maxemchuk in their paper "Reliable broadcast protocols," which appears in the journal *ACM Transactions on Computer Systems* vol. 2, pages 251-73 (1984), incorporated herein by reference in its entirety.

Team members 202 receiving the request message 308 respond with a specific skills message 310 to the broker 112. The broker 112 receives all of the specific skills messages 310 from all the responding team members 202 and aggregates them into a single aggregated response message 312 sent to the employer 106. Preferably, the broker 112 eliminates duplicate responses from multiple team members 202 in its aggregation. Those skilled in the art will recognize that other interactions between employers 106, brokers 112, and team members 202 can be implemented in a manner analogous to the protocol depicted in FIG. 3.

Figure 4:
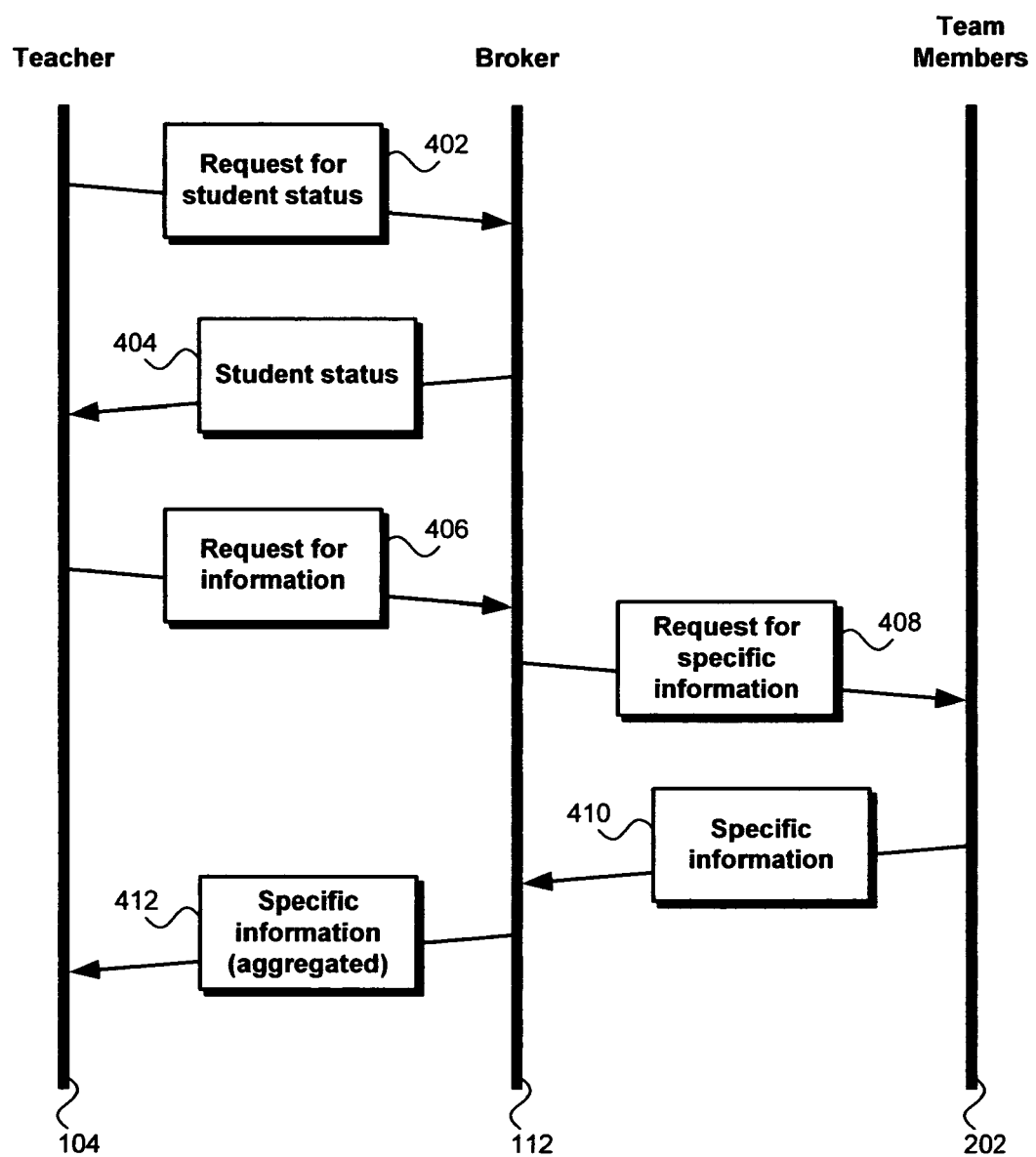
FIG. 4 shows an exemplary flow of messages between a team teacher, a team broker and team members.

With reference now to FIG. 4, the flow of messages between a teacher 104, team broker 112 and team members 202 is shown. In such a scenario, for instance, the virtual team may be manifested as a virtual student and the teacher 104 may be querying the status of the virtual student. Thus, the message flow begins with a request for student status message 402 issued from the teacher 104 to the broker 112. The broker 112, upon receipt of the message 402, responds with a student status message 404 that summarizes the status of the virtual team as a student. This message 404 could contain, for example, a record of attendance, examination grades and homework completion status. The teacher 104, however, may require more detailed information about the virtual student. For example, the teacher 104 may need to set up a meeting with one or more of the team members 202, or may need to review progress in a specific assignment. The teacher 104 can accomplish such tasks by issuing a request for specific information message 406 to the broker 112. As described previously, the broker 112 may then query each team member 202 individually by sending request for specific information messages 408 to the team members 202. The response messages 410 from the students are received by the broker 112 and aggregated. An aggregated message 412 is then created by the broker 112 and sent to the teacher 104. Those skilled in the art will recognize that other interactions between teachers 104, brokers 112, and team members 202 can be implemented in a manner analogous to the protocol depicted in FIG. 4.

Figure 5A:
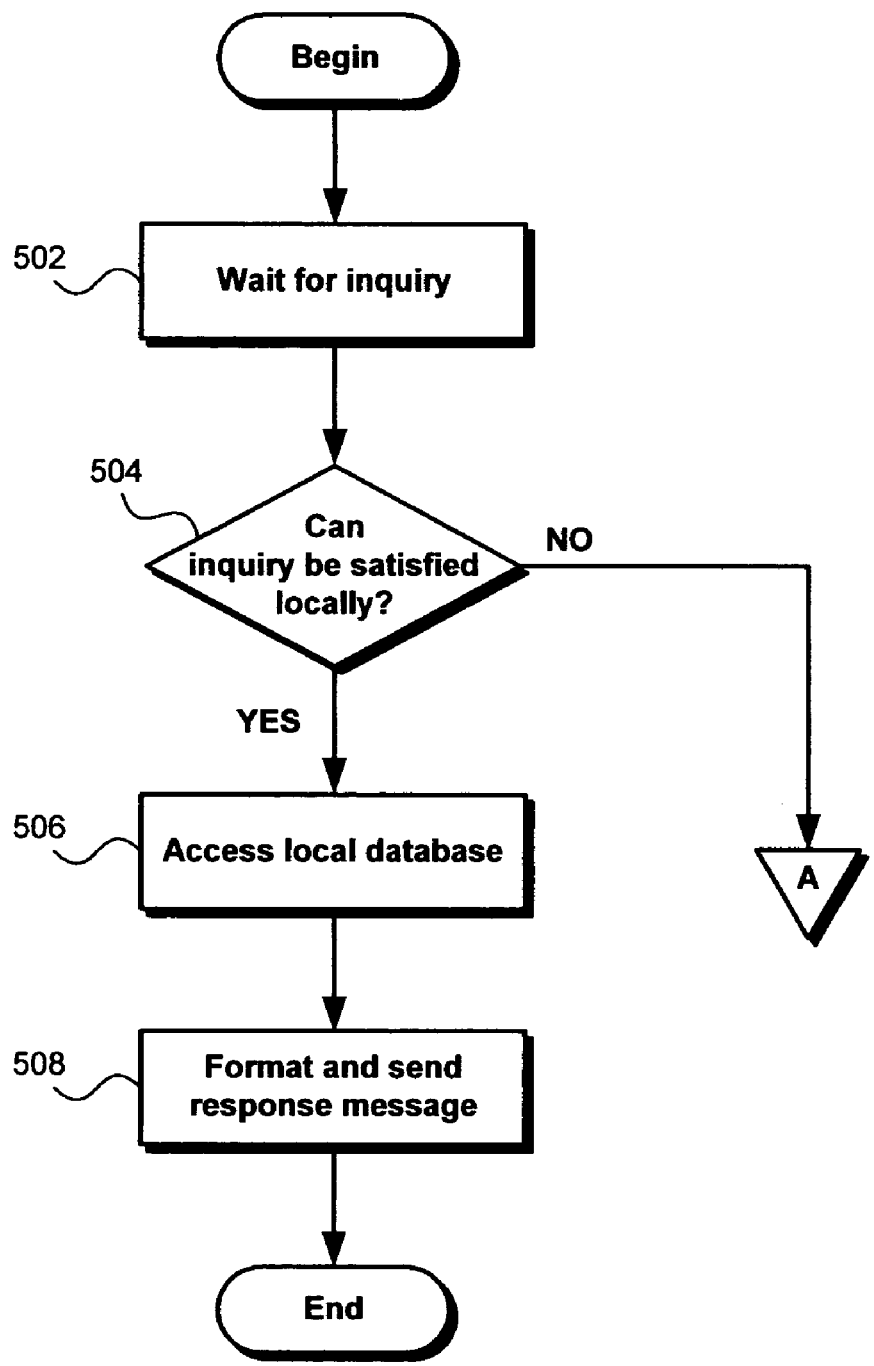
FIGS. 5A and 5B show a flowchart for processing a broker response to an inquiry form a third party, as contemplated by the present invention.
Figure 5B:
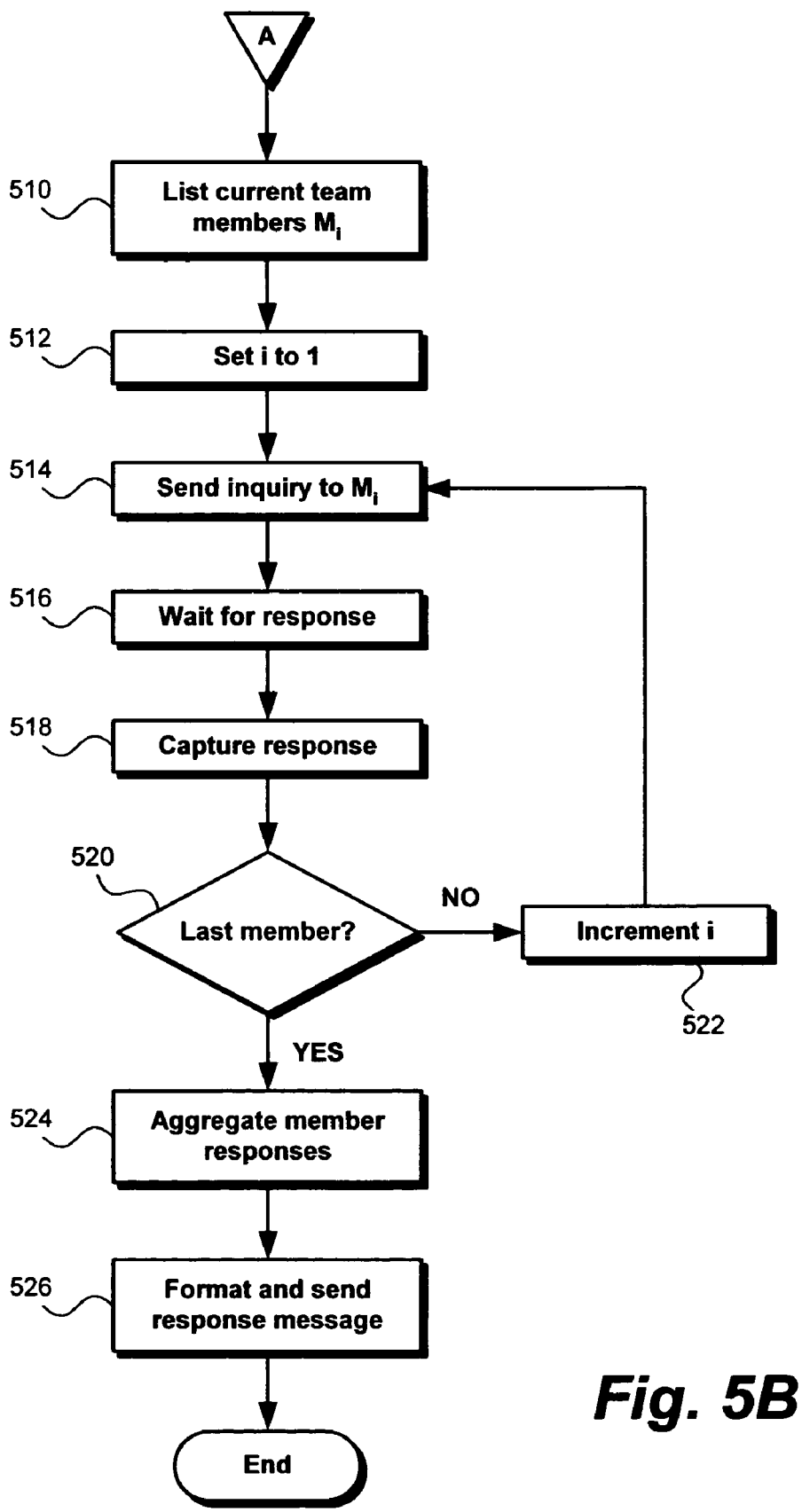

FIGS. 5A and 5B show the basic processing of the broker in response to an inquiry from either a teacher or an employer, as contemplated by one embodiment of the invention. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

Process flow begins at waiting operation 502. During this operation, broker waits until an inquiry is received from a third party. Once at inquiry is received, control passes to determining operation 504. At determining operation 504, the broker analyzes the inquiry to ascertain the type of inquiry received. If it is an inquiry for summary data, the inquiry can be satisfied locally and control passes to accessing operation 506. At accessing operation 506, the broker accesses a local database to obtain the desired summary information. Next, at sending operation 508, the broker formats and sends a response message to the third party.

If, at determining operation 504, the broker determines that the inquiry cannot be satisfied locally, control passes to identifying operation 510, shown in FIG. 5B. During identifying operation 510, the current team members of the virtual team are discovered and enumerated. Various protocols are available for this identification. For example, team members may be required to register with the broker upon joining the virtual team and may be required to un-register when leaving it. Team members may be automatically un-registered if they are found to be unresponsive to messages as well. Alternatively, a protocol similar to a service discovery protocol (e.g., SLP) can be used to discover team members. SLP is documented as Internet Engineering Task Force RFCs 2165 and 2608 available from www.ietf.org, and are incorporated herein by reference in their entirety.

Once the team members are identified, control passes to initializing operation 512, where a local index i is set to 1. The local index is used in sending operation 514 to select from a list of team members belonging to the virtual team. During this operation, the broker requests specific information from team members by sending inquiry messages to team members identified by index i. At waiting operation 516, the broker waits for a response from the team member. Once a team member response is received, control passes to capturing operation 518, where the broker stores the response. Next, at testing operation 520, the broker tests whether specific inquiries have been sent to all the team members. If more inquiries to other team members are required, control passes to incrementing operation 522. At incrementing operation 522, the index i is incremented to point to the next team member. Control then returns to sending operation 514 and the process is repeated until all the team members have returned specific information to the broker.

After the broker has received responses from all the team members, control passes from testing operation 520 to aggregating operation 524. At aggregating operation 524, the responses from the team members are aggregated such that redundant or unnecessary information is eliminated as appropriate. Once the team member messages are aggregated, control passes to sending operation 526. During sending operation 526, the broker formats and sends a response to the original enquirer.

Figure 6:
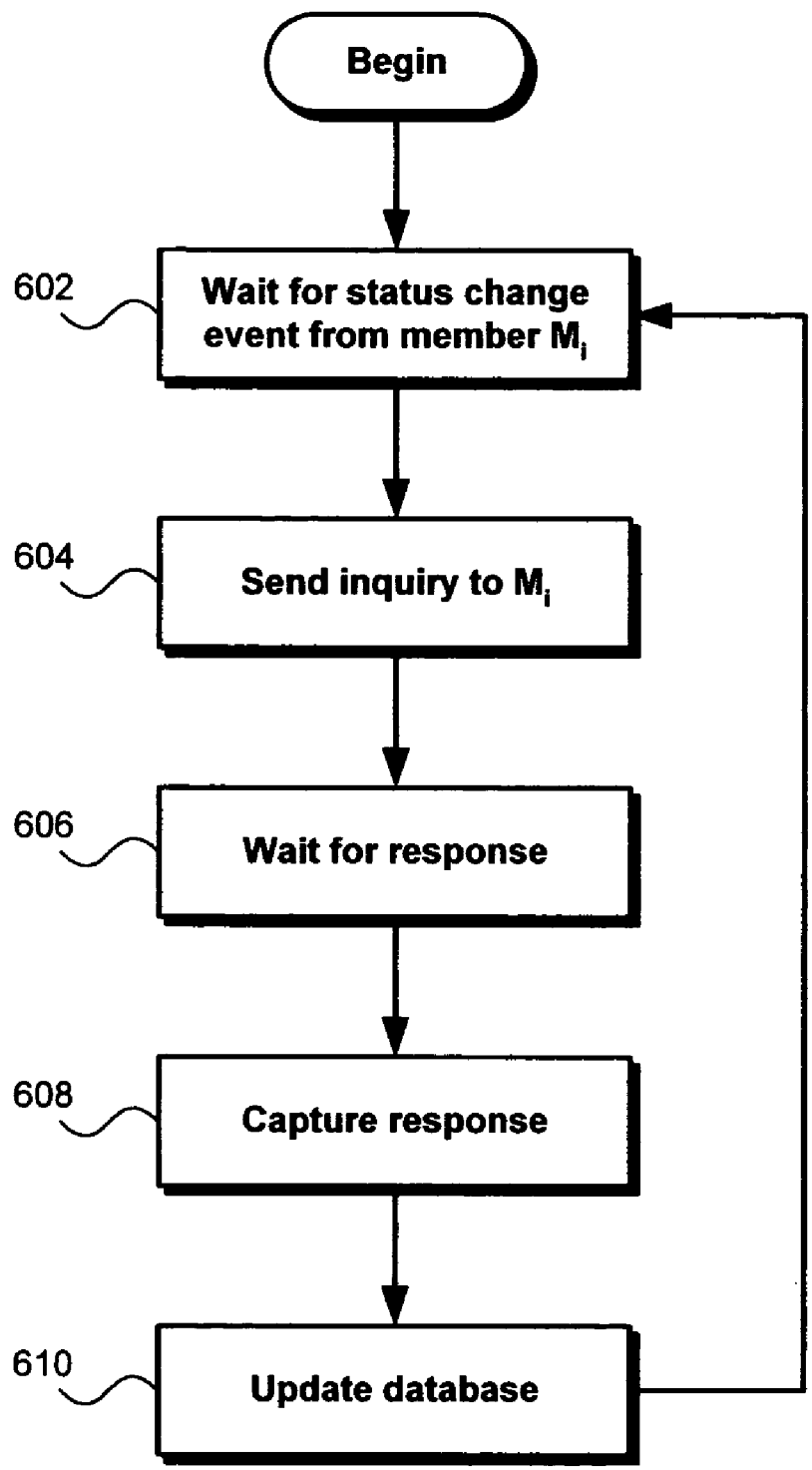
FIG. 6 shows an exemplary process for maintaining current and accurate summary information by a broker about a virtual team.

Turning now to FIG. 6, an exemplary process for a broker to maintain current and accurate summary information about the virtual team is shown. The process starts at waiting operation 602. During waiting operation 602, the broker waits for the arrival of an event message from one of the team members indicating that there has been a change in status of that team member. In such a configuration, all team members are responsible for originating an event message if their status changes. When the event message arrives at the broker, control passes from waiting operation 602 to sending operation 604.

At sending operation 604, the broker examines the event message contents, including the identification of the team member who sent the message, and sends an inquiry message to that team member. The inquiry message may be a general inquiry, or can be specific to the content of the event message. After sending the inquiry message, the broker again waits at waiting operation 606 for a response from the team member. Once a response is received by the broker, control passes to capturing operation 608, where the contents of the team member's response are analyzed. Next, at updating operation 610, the contents of the response message are used to update the broker's local database. After the broker's records are updated, control returns to waiting operation 602, where the broker waits for the next status change event notification from team members.

The foregoing description of the invention has been presented for purposes of illustration and description. It is not intended to be exhaustive or to limit the invention to the precise form disclosed, and other modifications and variations may be possible in light of the above teachings. It can be seen that the description given above provides a simple, but complete implementation of a virtual team. That is, embodiments have been presented allowing a third party, such as an employer or a teacher, to interact with what appears to be a real entity, but is in fact a proxy for a virtual team. The virtual team can be composed of members, some or all of which may be virtual teams. There are many kinds of inquiries to and other actions demanded of virtual teams, all of which can be implemented by the methods herein disclosed.

The embodiments described herein enable many forms of virtual teams. The members of these teams may be individuals, teams, virtual teams, or computer-based service implementations. The purposes for the formation of a virtual team are various, including, but not limited to, geographically-dispersed teams, teams in which membership is fluid, teams in which the membership overlaps with other teams, and the like. The virtual team may consist of members who are members of other virtual teams at the same time, or members who join the team at different instants in time. At any given time there may be zero, one or more members of the team. If the team's workload does not demand real-time response, the team can be formed on demand—that is, the virtual team can be formed from members joining the team after the demand for work is received. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A system for interacting with team members of a virtual team, the system comprising:
   a computer processor coupled to computer readable memory, the computer readable memory configured to store collective qualifications of the virtual team based on the individual qualifications of the team members, the virtual team including a first team member having a first qualification and a second team member having a second qualification, the collective qualifications include the first qualification and the second qualification; and
   a team broker configured to present the collective qualifications to third parties; and
   wherein the collective qualifications include certification from an education service provider that the virtual team has collectively completed one or more educational objectives even if no individual team member has completed the one or more educational objectives.

2. The system of claim 1, wherein the collective qualifications includes experience information.

3. The system of claim 1, wherein the third parties include a team employer.

4. The system of claim 1, wherein team broker is further configured to:
   receive an inquiry about the virtual team from a third party;
   retrieve team information from the computer readable memory; and
   send an inquiry response to the third party, the inquiry response including the team information.

5. The system of claim 4, wherein the team broker is further configured to select candidate virtual teams satisfying specifications in a team selection criteria received from the third party.

6. The system of claim 5, wherein the candidate virtual teams are ordered according to a criteria score.

7. The system of claim 1, wherein team broker is further configured to:
   receive qualification notification from at least one team member that the team member's qualifications have changed; and
   update the collective qualifications of the virtual team to reflect the change in the team member's qualifications.

8. The system of claim 1, wherein the team broker is further configured to bill the third parties based on access to the collective qualifications.

9. The system of claim 1, wherein the team broker is further configured to bill the team members based on access to the collective qualifications.

10. A computer program product embodied in a tangible media comprising:
    computer readable program codes coupled to the tangible media for interacting with team members of a virtual team, the computer readable program codes configured to cause the program to:
    present collective qualifications of the virtual team based on stored information about individual team members of the virtual team from a centralized database, the virtual team including a first team member having a first qualification and a second team member having a second qualification, the collective qualifications include the first qualification and the second qualification;
    receive certification from an education service provider that the virtual team has collectively completed one or more educational objectives even if no individual team member has completed the one or more educational objectives;
    update the collective qualifications of the virtual team to include the completed one or more educational objectives by the virtual team;
    receive an inquiry about the virtual team from a third party;
    retrieve team information about the virtual team from a centralized database; and
    send an inquiry response to the third party, the inquiry response including at least some of the team information from the centralized database.

11. The computer program product of claim 10, further comprising program code configured to:
    determine that specific information from at least one team member is required in the inquiry response; and
    request the specific information from the at least one team member.

12. The computer program product of claim 11, further comprising program code configured to receive specific information responses from the team members in response to requests for specific information.

13. The computer program product of claim 12, further comprising program code configured to aggregate the specific information responses from the team members, such that duplicate responses from multiple team members are eliminated.

14. The computer program product of claim 10, wherein the team information includes knowledge data about the team members.

15. The computer program product of claim 10, wherein the team information includes skill data about the team members.

16. The computer program product of claim 10, wherein the third party is a team employer.

17. The computer program product of claim 10, further comprising program code configured to:
   receive qualification notification from at least one team member that the team member's qualifications have changed; and
   update the team information to reflect the change in the team member's qualifications.

18. The system of claim 1, wherein the virtual team is comprised of a group of team members with a common objective.

19. The computer program product of claim 10, wherein the virtual team is comprised of a group of team members with a common objective.

* * * * *